United States Patent
Tavildar et al.

(10) Patent No.: US 9,584,281 B2
(45) Date of Patent: Feb. 28, 2017

(54) POSITION BASED SIGNALING FOR SHORT PACKETS WITH MINIMAL INTERFERENCE TO THE MACRO

(75) Inventors: Saurabh Tavildar, Jersey City, NJ (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/343,571

(22) Filed: Jan. 4, 2012

(65) Prior Publication Data

US 2013/0170440 A1  Jul. 4, 2013

(51) Int. Cl.
*H04L 5/00* (2006.01)
*H04W 92/18* (2009.01)

(52) U.S. Cl.
CPC .......... *H04L 5/0053* (2013.01); *H04L 5/0007* (2013.01); *H04W 92/18* (2013.01)

(58) Field of Classification Search
CPC .. H04J 11/0023–11/003; H04J 11/0036; H04J 11/005–11/0053; H04L 5/0005; H04L 5/0007; H04L 5/001; H04L 5/0048–5/0062; H04W 72/0406–72/0453; H04W 72/048; H04W 72/08–72/087; H04W 72/1263–72/1289; H04W 74/002–74/008
USPC .......................... 370/328–330, 436–437, 468
See application file for complete search history.

(56) References Cited

U.S. PATENT DOCUMENTS

| 8,107,481 B2 | 1/2012 | Li et al. |
| 8,687,479 B2 | 4/2014 | Li et al. |
| 2009/0016271 A1 | 1/2009 | Li et al. |
| 2009/0199069 A1* | 8/2009 | Palanki et al. ................. 714/755 |
| 2010/0118842 A1* | 5/2010 | Kalhan ......................... 370/338 |
| 2010/0240386 A1 | 9/2010 | Hamabe et al. |
| 2010/0273498 A1 | 10/2010 | Kim et al. |

(Continued)

FOREIGN PATENT DOCUMENTS

| WO | WO-2009009542 A2 | 1/2009 |
| WO | WO-2010042340 A1 | 4/2010 |

(Continued)

OTHER PUBLICATIONS

Partial International Search Report—PCT/US2012/071373—ISA/EPO—Mar. 11, 2013.
International Search Report and Written Opinion—PCT/US2012/071373—ISA/EPO—Jun. 6, 2013.
3GPP TR 36.921: "3rd Generation Partnership Project; Technical Specification Group Radio Access Network; Evolved Universal Terrestrial Radio Access (E-Utra); FDD Home eNode B (HeNB) Radio Frequency (RF) Requirements Analysis", Release 10, 3GPP TR 36.921, Apr. 12, 2011, V10.0.0, Jul. 28, 2016, pp. 1-45, URL, http://www.3gpp.org/ftp/Specs/archive/36_series/36.921/36921-a00.zip.

(Continued)

*Primary Examiner* — Peter Cheng
(74) *Attorney, Agent, or Firm* — James K. O'Hare

(57) ABSTRACT

Methods and apparatus for communicating short messages from a first device, e.g., a femto cell device or peer to peer device, over communications resources which are being used by an OFDM macro network, e.g., cellular network, are described. The signal goes on top of, e.g., is transmitted on the same communications resource(s), on which a macro signal, e.g. a downlink signal from a cellular base station, is transmitted. Since the signals are transmitted on the same resources as the signals from the macro base station, they interfere with the macro signal. However, the signals transmitted by the femto cell devices and/or peer to peer devices are designed so that they cause little interference to the macro base station in terms of overall throughput and/or with the macro base station's ability to communicate control and/or pilot information.

18 Claims, 9 Drawing Sheets

(56) References Cited

U.S. PATENT DOCUMENTS

| | | |
|---|---|---|
| 2010/0278132 A1 | 11/2010 | Palanki et al. |
| 2011/0044259 A1 | 2/2011 | Nimbalker et al. |
| 2011/0116358 A9 | 5/2011 | Li et al. |
| 2011/0300870 A1 | 12/2011 | Chun et al. |
| 2011/0310858 A1 | 12/2011 | Tokgoz et al. |

FOREIGN PATENT DOCUMENTS

| | | |
|---|---|---|
| WO | WO2010105693 A1 | 9/2010 |
| WO | WO-2010127332 A2 | 11/2010 |
| WO | WO2010149293 A1 | 12/2010 |
| WO | WO-2011159954 A1 | 12/2011 |

OTHER PUBLICATIONS

LG Electronics: "Comparison of Time-domain eICIC Solutions", 3GPP TSG RAN WG1 Meeting #62, R1-104661, Aug. 17, 2010, Jul. 28, 2016, 8 Pages, URL, http://www.3gpp.org/ftp/tsg_ran/WG1_RL1/TSGR1_62/Docs/R1-104661.zip.

LG Electronics: "Methods to Facilitate the Inter-Cell Coordination in Heterogeneous Networks", 3GPP TSG RAN WG1 Meeting #61, R1-102705, URL: http://www.3gpp.org/ftp/tsg_ran/WG1_RL1/TSGR1_61/Docs/R1-102705.zip, May 4, 2010, Jul. 28, 2016, 3 Pages, URL, http://www.3gpp.org/ftp/tsg_ran/WG1_RL1/TSGR1_61/Docs/R1-102705.zip

* cited by examiner

POSITION BASED SIGNALING FOR SHORT PACKETS WITH MINIMAL INTERFERENCE TO THE MACRO

FIELD

Various embodiments relate to wireless communications, and more particularly, to two wireless communications devices using some of the same air link resources concurrently.

BACKGROUND

Macro communications devices, e.g., cellular base stations, which communicate with wireless terminals in a relatively large, e.g., macro, cell, are subject to interference when other devices within the macro cell attempt to use the same communications resources, e.g., time frequency resources, being used by the base station to communicate with wireless terminals being serviced by the base station.

Examples where interference with communications between a macro base station and wireless terminal are likely to occur include: (i) the case where a femto cell device, e.g., a femto cell base station, located within a macro cell uses the same communications resources to communicate with a device, e.g., a femto cell wireless terminal, and (ii) the case where a peer to peer device in the macro cell attempts to communicate with another peer to peer communications device using the same resources as those being used by the macro cell.

Femto cell devices and other devices such as peer to peer devices often need to transmit short signals, e.g., control information, discovery signals, and/or other signals. Such signals while often being short in terms of duration and/or the number of bits they communicate are often important for the devices communicating within the femto cell and/or in the case for peer to peer devices to enable successful peer device discovery and peer to peer communications. Accordingly, it is often desirable for the femto cell devices or peer to peer devices to transmit such signals at relatively high power. Unfortunately, the transmissions of such signals on communications resources being used by the macro base station can interfere with the base station and negatively impact overall macro cell throughput particular when such signals interfere with pilots and/or control signals being transmitted by the macro base station. Such interference is particularly of concern as in many systems where the femto cells and peer to peer devices are not directly controlled by the base station, e.g., to limit or avoid interference to communications between the macro base station and the wireless terminals being serviced by the macro base station.

In view of the above discussion, it should be appreciated that there is a need for improved methods and apparatus for allowing femto cell devices and/or other devices to transmit short messages or signals using communications resources which are also being used by a base station without the need for the base station to control or interact with the femto cell or peer to peer device using the same resources as the macro base station.

SUMMARY

Methods and apparatus for communicating short messages from a first device, e.g., a femto cell device or peer to peer device, over communications resources which are being used by an OFDM macro network, e.g., cellular network, are described. The signal goes on top of, e.g., is transmitted on the same communications resource(s), on which a macro signal, e.g. a downlink signal from a base station of a macro cell such as a cellular base station, is transmitted. Since the signals from the femto cell and/or peer to peer devices are transmitted on the same resources as the signals from the macro base station, they interfere with the macro signal and potentially destroy a portion of the macro signal. However, the signals transmitted by the femto cell devices and/or peer to peer devices are designed so that they cause little interference to the macro base station in terms of overall throughput and/or with the macro base stations ability to communicate control and/or pilot information.

An exemplary method of operating a first communications device located within a cell of a base station, to communicate information to a wireless terminal using communications resources which are also being used by said base station, in accordance with some embodiments, comprises: identifying resource blocks being used by said base station to communicate traffic data; identifying sets of tone-symbols available in said resource blocks to said first communications device for use in transmitting information; and communicating information by transmitting energy on a limited number of available tone-symbols in a set of resource blocks being used by said base station. A exemplary first communications device, in accordance with some embodiments, comprises at least one processor configured to: identify resource blocks being used by said base station to communicate traffic data; identify sets of tone-symbols available in said resource blocks to said first communications device for use in transmitting information; and communicate information by transmitting energy on a limited number of available tone-symbols in a set of resource blocks being used by said base station. The exemplary first communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
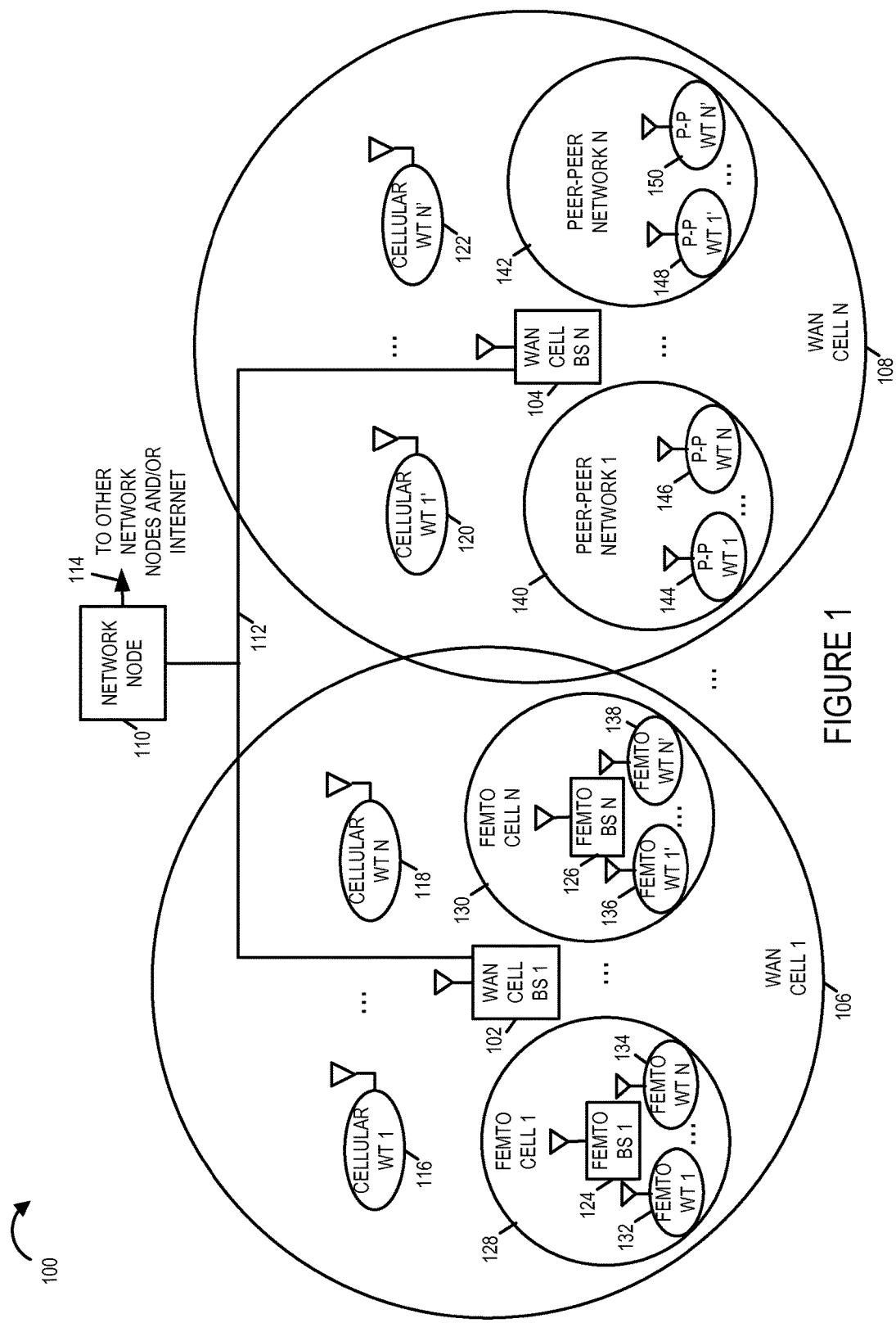
FIG. 1 is a drawing of an exemplary communications system in accordance with various exemplary embodiments.

FIG. 1 is a drawing of an exemplary communications system 100 in accordance with an exemplary embodiment. Exemplary communication system 100 includes a plurality of wide area network (WAN) base stations (WAN cellular base station 1 102, . . . , WAN cellular base station N 104). Each base station (WAN cellular base station 1 102, . . . , WAN cellular base station N 104) has a corresponding cellular coverage area (WAN cell 1 106, . . . , WAN cell N 108), respectively. There are also a plurality of cellular wireless terminals, e.g., mobile nodes supporting cellular communications, which may move throughout the system 100. A plurality of cellular wireless terminals (cellular wireless terminal 1 116, . . . , cellular wireless terminal N 118) are located in WAN cell 1 106. A plurality of cellular wireless terminals (cellular wireless terminal 1' 120, . . . , cellular wireless terminal N' 122) are located in WAN cell N 108. The WAN base stations (102, . . . , 104) are coupled to one another and to a network node 110 via backhaul network 112. The network node 110 is coupled to other network nodes and/or the Internet via link 114. The cellular wireless terminals communicate with one another via one or more WAN base stations.

Within WAN cell 1 106, there are a plurality of femto cells (femto cell 1 128, . . . , femto cell N 130). Femto cell 1 128 includes femto base station 1 124 and a plurality of femto wireless terminals (femto wireless terminal 1 132, . . . , femto wireless terminal N 134). Femto cell N 130 includes femto base station N 126 and a plurality of femto wireless terminals (femto wireless terminal 1' 136, . . . , femto wireless terminal N' 138). A femto wireless terminal, e.g., a mobile wireless communications device supporting femto cell communications may communicate with other femto wireless terminals within its femto cell via the femto base station of the femto cell. In some embodiments, femto base stations are coupled together allowing femto wireless terminals from different femto cells to communicate with one another. In some embodiments, femto base stations are coupled to the WAN cellular backhaul network allowing femto wireless terminals to communicate with cellular wireless terminals.

Within WAN cell N 108, there are a plurality of peer to peer networks (peer to peer network 1 140, . . . , peer to peer network N 142). In at least some embodiments peer to peer communication is used to refer to direct device to device communication. In the case of peer to peer communication, the communication does not pass through an infra-structure element such as a base station as is communicated from one device to the other device. Peer to peer network 1 140, e.g., an ad-hoc peer to peer network, includes a plurality of peer to peer wireless terminals, e.g., mobile nodes supporting a peer to peer communications protocol, (peer to peer wireless terminal 1 144, . . . , peer to peer wireless terminal N 146), which may communicate with one another. Peer to peer network N 142, e.g., an ad-hoc peer to peer network, includes a plurality of peer to peer wireless terminals, e.g., mobile nodes supporting a peer to peer communications protocol, (peer to peer wireless terminal 1' 148, . . . , peer to peer wireless terminal N' 150), which may communicate with one another, e.g., directly and not through an intermediate device.

Femto cell devices and peer to peer devices may, and sometimes do, use some of the same air link resources concurrently with WAN cellular devices. For example, in some embodiments, femto cell base station 1 102 may, and sometimes does, transmit at least some signals on some of the same air link resources being used by WAN cell base station 1 102 to transmit downlink data signals to cellular wireless terminals (116, . . . , 118). As another example, in some embodiments, peer to peer wireless terminal 1 144 may, and sometimes does, transmit at least some signals, e.g., peer to peer discovery signals on some of the same air link resources being used by WAN cell base station N 104 to transmit downlink data signals to cellular wireless terminals (120, . . . , 122). In various embodiments, the signals transmitted by the femto cell devices or the peer to peer devices which use the same air link resources as the cellular base station devices communicate information using position encoding. In various embodiments, disturbances to the communications within the WAN cellular base station due to the concurrent femto cell transmissions or peer to peer transmission using the same air link resources are absorbed and within a tolerable level due to the level of redundancy build into the cellular communications error coding selected and used for the data communications.

In some embodiments, a WAN cell may, and sometimes does, include both femto cells and peer to peer networks. In some embodiments, in which femto cells and peer to peer networks overlap, there is a predetermined ordering preference as to which one of the femto cell and the peer to peer network is allowed to use the same air link resources concurrently with the cellular devices. In some embodiments, the femto cells take precedence over the peer to peer networks, e.g., a peer to peer ad-hoc network is only allowed to use the shared cellular resources if there is not a femto cell in its vicinity or a detected femto cell in its vicinity is not using the shared cellular resources.

In various embodiments, the cellular network is using an OFDM based signaling protocol. In some such embodiments, the signals communicated by the femto cell devices and/or the peer to peer devices using the same air link resources as the cellular network devices are also OFDM signals.

In some embodiments, a particular device, e.g., a particular mobile wireless device, may, and sometimes is, at different times a different type of device, e.g., a cellular wireless device, a femto cell wireless device or a peer to peer wireless device, depending upon which communications protocol it is using and/or which communications network it has decided to participate in at a given point in time.

Figure 2:
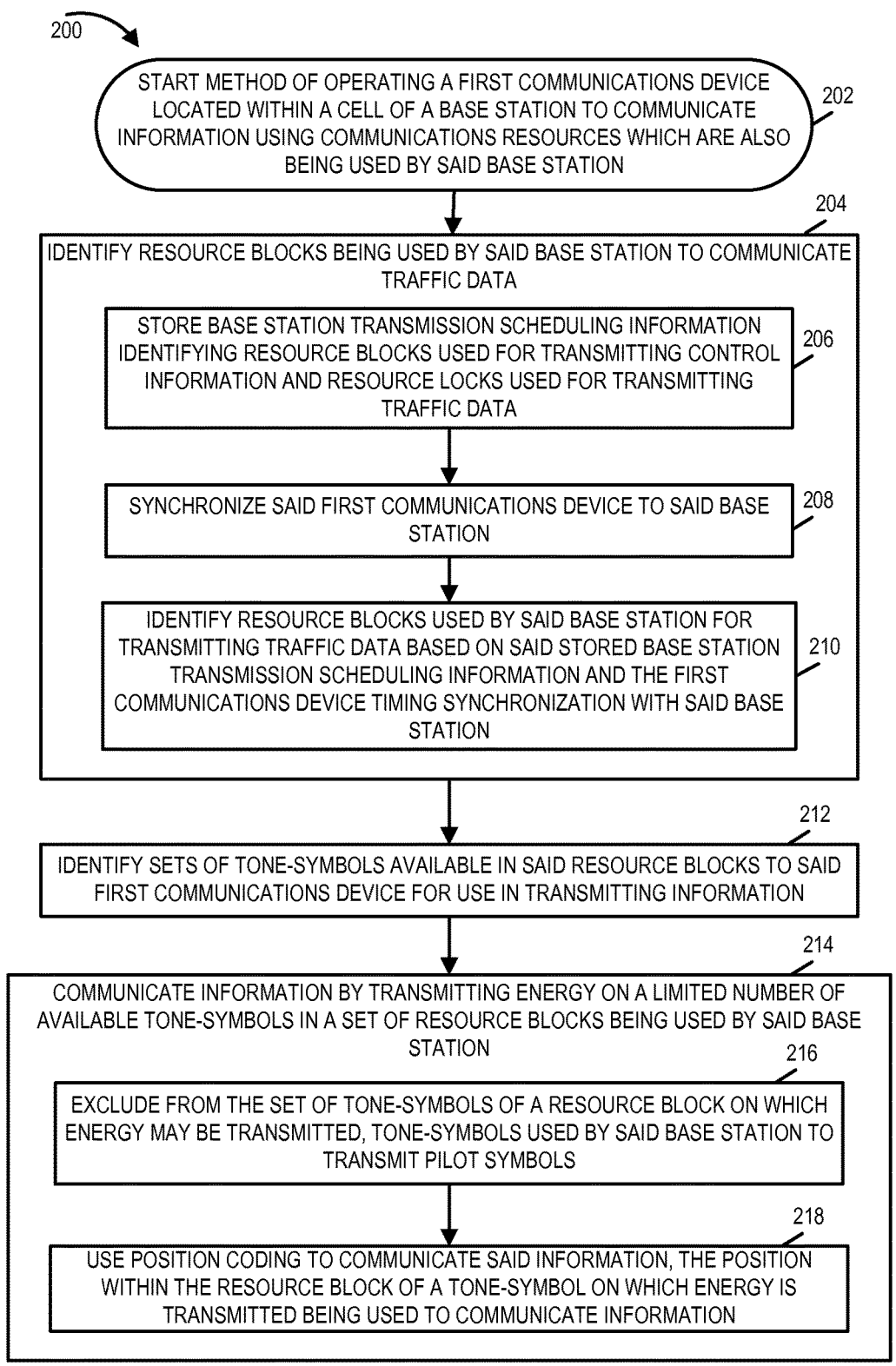
FIG. 2 is a flowchart of an exemplary method of operating a first communications device, e.g., a femto cell device or peer to peer wireless device, in accordance with various exemplary embodiments.

FIG. 2 is a flowchart 200 of an exemplary method of operating a first communications device located within a cell of a base station, e.g., a macro base station, to communicate information using communications resources which are also being used by said base station. In some embodiments, the first communications device is a femto cell device, e.g. a femto cell base station or a femto cell mobile wireless terminal. For example, in one embodiment, the first communications device is a femto cell base station and the first communications device is communicating information to a femto cell wireless terminal. In some embodiments, the first communications device is a peer to peer communications device, e.g., a peer to peer wireless terminal. In some such embodiments, the first communications device is communicating information to another peer to peer device, e.g., another peer to peer wireless terminal. Operation of the exemplary method starts in step 202, where the first communications device is powered on and initialized. Operation proceeds from start step 202 to step 204. In step 204, the first communications device identifies resource blocks being used by said base station to communicate traffic data. Step 204 includes steps 206, 208 and 210. In step 206 the first communications device stores base station transmission scheduling information identifying resource blocks used for transmitting control information and resource blocks used for transmitting traffic data. Operation proceeds from step 206 to step 208, in which the first communications device synchronizes the first communications device to said base station. Then, in step 210 the first communications device identifies resource blocks used by said base station for transmitting traffic data based on said stored transmission scheduling information and the first device timing synchronization with said base station.

Operation proceeds from step 204 to step 212. In step 212 the first communications device identifies sets of tone-symbols available in said resource blocks to said first communications device for use in transmitting information. Operation proceeds from step 212 to step 214. In step 214 the first communications device communicates information, e.g., control information or peer discovery information, by transmitting energy on a limited number of available tone-symbols in as set of resource blocks being used by said base station. Step 214 includes step 216 and step 218.

In step 216 the first communications device excludes from the set of tone-symbols of a resource block on which energy may be transmitted, tone-symbols used by said base station to transmit pilot symbols. And, in step 218 the first communications device uses position coding to communicate said information, the position within the resource block of a tone-symbol on which energy is transmitted being used to communicate information.

In some embodiments, transmitting energy on a limited number of available tone-symbols in a set of resource blocks being used by said base station includes transmitting energy on less than two percent of the tone-symbols in each resource block in said set of resource blocks. In some such embodiments, transmitting energy on a limited number of available tone-symbols in a set of resource blocks being used by said base station includes transmitting energy on no more than a single tone-symbol of each resource block. In some such embodiments, each resource block includes at least 50 tone-symbols.

In some embodiments, transmitting energy on a limited number of available tone-symbols in a set of resource blocks including transmitting power on individual tone-symbols at a transmission power level which is as high or higher than the highest transmission power level used by said first communications device to transmit traffic data.

In some embodiments, the first communications device is a femto cell located in a macro cell corresponding to said base station. In some such embodiments, the transmitted information is control information.

In some embodiments, the transmitted information is latency critical information, e.g., a packet or packet portion of latency critical data. In some embodiments, the transmitted information is high priority data. In some embodiments, the first communications device is a femto cell base station and the transmitted information is latency critical data directed to the femto cell mobile node having the shortest remaining deadline to transmission. In some embodiments, the first communications device is a femto cell base station, and the femto cell mobile device, to which the transmitted information is directed, is selected as a function of the femto cell mobile devices' priority levels, e.g., the femto cell mobile with the highest priority level is selected to be the recipient. In some embodiments, the first communications device is a femto cell base station, and the femto cell mobile device, to which the transmitted information is directed, is selected as a function of the femto cell mobile devices' subscriber service levels, e.g., the femto cell mobile device with the highest service level is selected to be the recipient.

In some embodiments, the first communications device is a peer to peer communication device located in a macro cell corresponding to said base station. In some such embodiments, the transmitted information is peer discovery information. In some such embodiments, the peer to peer device is a mobile peer to peer device.

In some embodiments, a peer to peer network may, and sometimes does overlap with a peer to peer network, e.g., an ad hoc peer to peer network, within the same WAN cell. In some such embodiments, there is a predetermined ordering as to which type of device has precedence to use the same resources with the base station. In some such embodiments, femto cell devices take precedence over peer to peer network devices. In some such embodiments, if the first communications device is a peer to peer device, the exemplary method further includes determining whether or not the first communications device is located within a femto cell. In some such embodiments, the exemplary method further includes determining to proceed with the communication of information in step 214 when it is determined that the peer to peer device is not located in a femto cell. In some such embodiments, if the first communications device determines that it is located in a femto cell, the first communications device refrains from performing step 214.

In some embodiments, if the first communications device is a peer to peer device, the exemplary method further includes the steps of determining whether or not the first communications device is located within a femto cell, and determining if a femto cell device is communicating information by transmitting energy on a limited number of available tone-symbols in a set of resource blocks being used by said base station. In some such embodiments, the exemplary method further includes determining to proceed with the communication of information in step 214 when it is determined that the peer to peer device is not located in a femto cell or when it is determined that the peer to peer device is located in a femto cell in which a femto cell device is not communicating information by transmitting energy on a limited number of available tone-symbols in a set of resource blocks being used by a base station. In some such embodiments, if the first communications device determines that it is located in a femto cell in which a femto cell device is communicating information by transmitting energy on a limited number of available tone-symbols in a set of resource blocks being used by a base station, the first communications device refrains from performing step 214.

In some embodiments, at least some types of peer to peer network have priority over femto cells with regard to using the same resources being used by the macro base station, e.g., emergency responder peer to peer networks have priority over femto cells in some embodiments. For example, in some such embodiments if the first communications device is a peer to peer device in a emergency responder peer to peer network, the first communications device has priority over devices of an overlapping femto cell.

In some embodiments, the first communications device is one of a plurality of peer to peer communications devices which identifies sets of tone-symbols available in said resource blocks to use in transmitting information. In some embodiments, there is a predetermined ordering as to which one of the plurality of peer to peer devices is allowed to communicate information by transmitting energy on a limited number of available tone-symbols in a set of resource blocks being used by said base stations at a particular time. For example, in a recurring timing structure of the base station different peer to peer devices are allowed to communicate information by transmitting energy on a limited number of available tone-symbols in a set of resource blocks being used by said base station at different times, e.g., in accordance with a predetermined indexed ordering. In some embodiments, the predetermined indexed ordering corresponds to identifiers currently being held by the peer to peer devices.

In some embodiments, the first communications device is a femto cell base station and the femto cell base station is allowed to communicate information by transmitting energy on a limited number of available tone-symbols in a set of resource blocks being used by the base station; however, femto cell mobile nodes in the femto cell are not permitted to communicate information by transmitting energy on a limited number of available tone-symbols in a set of resource blocks being used by the base station. In some other embodiments, both a femto cell base station and a femto cell mobile node is allowed to communicate information by transmitting energy on a limited number of available tone-symbols in a set of resource blocks being used by the base station, e.g., at different times in accordance with a predetermined ordering. In some embodiments, a femto cell base station determines which device, e.g., the femto cell base station or which particular femto cell mobile node is allowed to communicate information by transmitting energy on a limited number of available tone-symbols in a set of resource blocks being used by the base station at a given time.

The flowchart 200 or portions thereof may be, and sometimes is, repeated multiple times, e.g., step 214 may be repeated multiple times corresponding to multiple transmission opportunities with different information being encoded and communicated at different times while the first communications is located within the same cell. In addition, consider that the first communications device is a mobile device which moves to a different base station cell. Then, the first communications device may repeat each of the steps of flowchart 200. For example, in different cells corresponding to different base stations different resource blocks may be used by a base station to communicate traffic data and different sets of tone-symbols may be available in said resource blocks available to said first communications device for use in transmitting information, and thus the first communications device may perform steps 204, 212 and 214 in the new cell.

Figure 3:
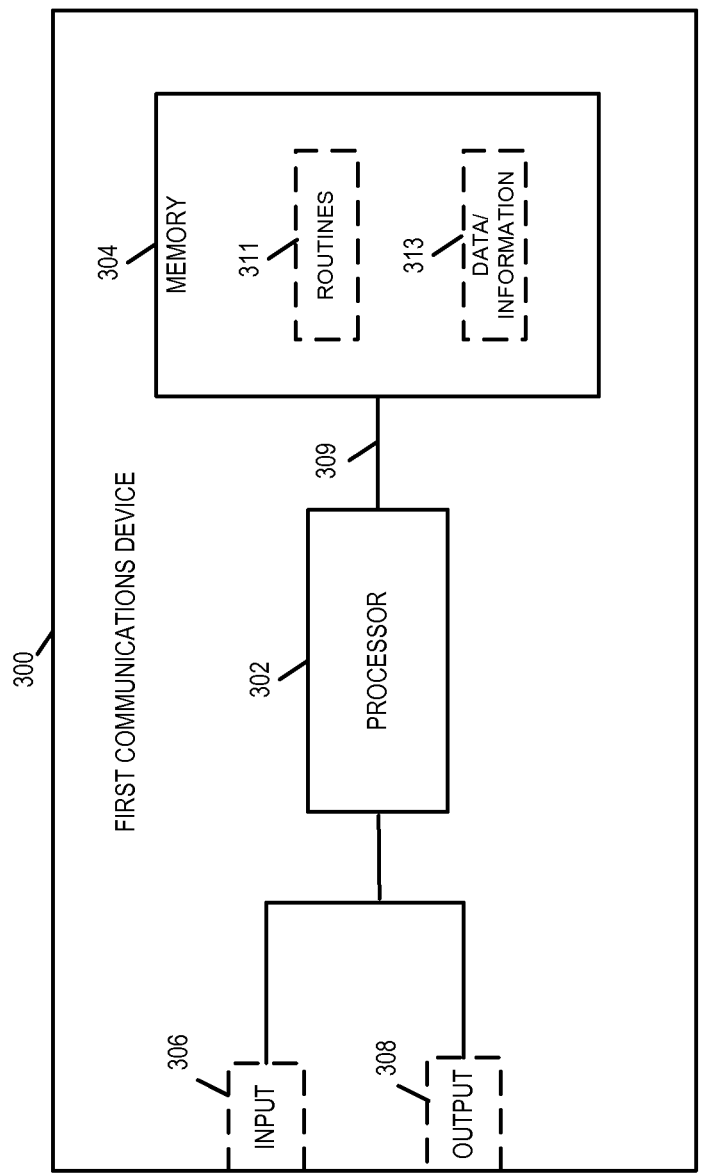
FIG. 3 is a drawing of an exemplary first communications device, e.g., a femto cell device or peer to peer wireless device, in accordance with an exemplary embodiment.

FIG. 3 is a drawing of an exemplary first communications device 300, e.g., a wireless communications device, in accordance with an exemplary embodiment. Exemplary first communications device 300 is, e.g., one of the femto cell devices (124, 126, 132, 134) or one of the peer to peer mobile devices (144, 146, 148, 150) of system 100 of FIG. 1. Exemplary first communications device 300 may, and sometimes does, implement a method in accordance with flowchart 200 of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to: identify resource blocks being used by said base station to communicate traffic data; identify sets of tone-symbols available in said resource blocks to said first communications device for use in transmitting information; and communicate information by transmitting energy on a limited number of available tone-symbols in a set of resource blocks being used by said base station. In some such embodiments, processor 302 is configured to use position coding to communicate said information, wherein the position within the resource block of a tone-symbol on which energy is transmitted is used to communicate information, as part of being configured to communicate information. In various embodiments, processor 302 is configured to: store base station transmission scheduling information identifying resource blocks used for transmitting control information and resource blocks used for transmitting traffic data; synchronize said first communications device to said base station; and identify resource blocks used by said base station for transmitting traffic data based on said stored base station transmission scheduling information and the first communications device timing synchronization with said base station, as part of being configured to identify resource blocks being used by said base station to communicate traffic data. In some embodiments, processor 302 is configured to: exclude from the set of tone-symbols of a resource block on which energy may be transmitted, tone-symbols used by said base station to transmit pilot signals, as part of being configured to communicate information.

In various embodiments, processor 302 is configured to transmit energy on less than two percent of the tone-symbols in each resource block in said set of resource blocks, as part of being configured to transmit energy on a limited number of available tone-symbols in a set of resource blocks being used by said base station. In some embodiments, processor 302 is configured to transmit energy on no more than a single tone-symbol of each resource block, as part of being configured to transmit energy on a limited number of available tone-symbols in a set of resource blocks being used by said base station. In some such embodiments, each resource block includes at least 50 tone-symbols. Processor 302, in some embodiments, is configured to transmit power on individual tone-symbols at a transmission power level which is as high or higher than the highest transmission power level used by said first communications device to transmit traffic data, as part of being configured to transmit energy on a limited number of available tone-symbols in a set of resource blocks.

In various embodiments, the first communications device is a femto cell device, e.g., a femto cell base station or a femto cell wireless terminal, located in a macro cell corresponding to said base station. In some such embodiments, said transmitted information is control information.

In some embodiments, the first communications device is a peer to peer communications device located in a macro cell corresponding to said base station. In some such embodiments, the transmitted information is peer discovery information.

Figures 4, 4A:
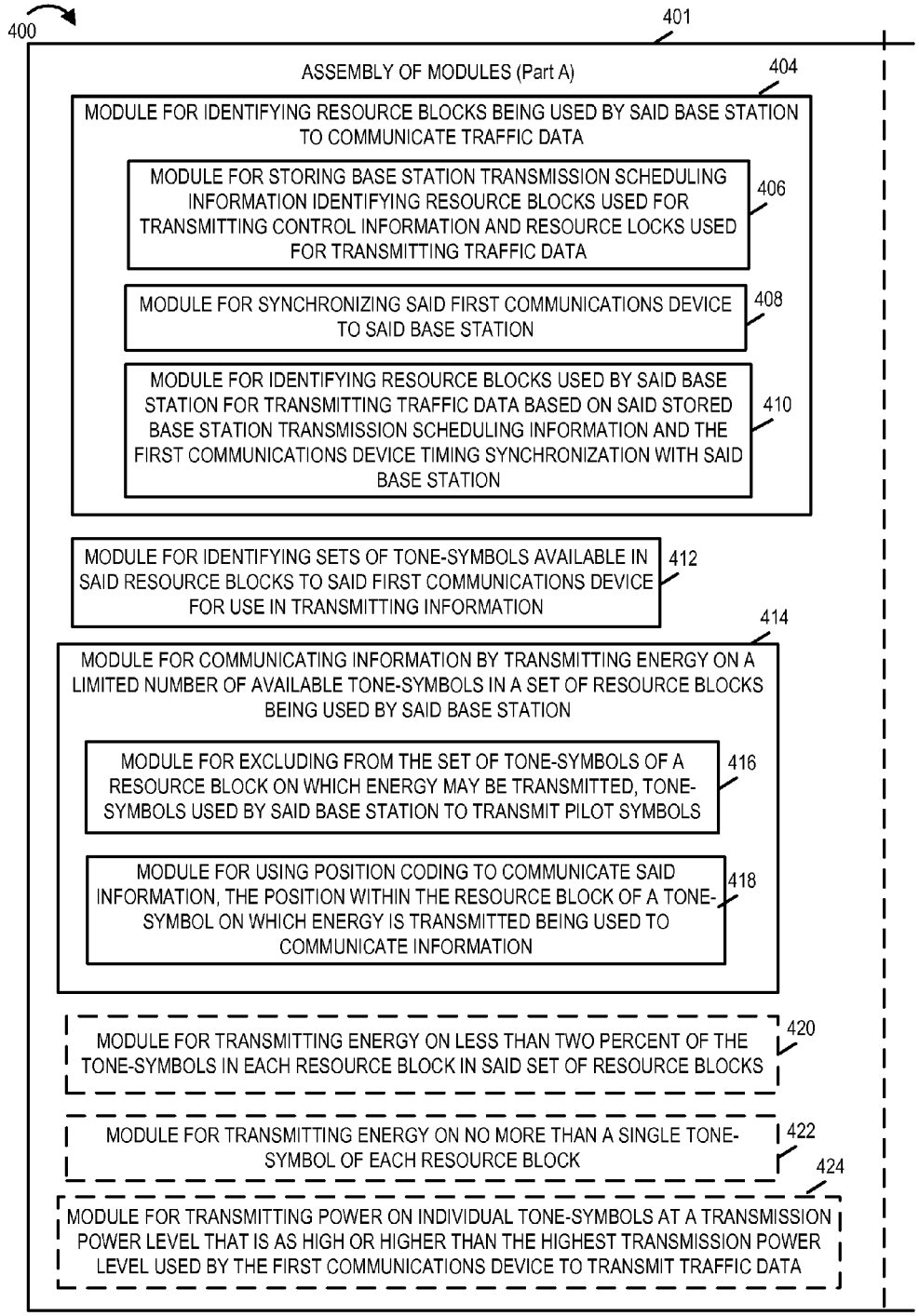
FIG. 4A is a first part of an assembly of modules which can, and in some embodiments is, used in the exemplary first communications device illustrated in FIG. 3.
Figure 4B:
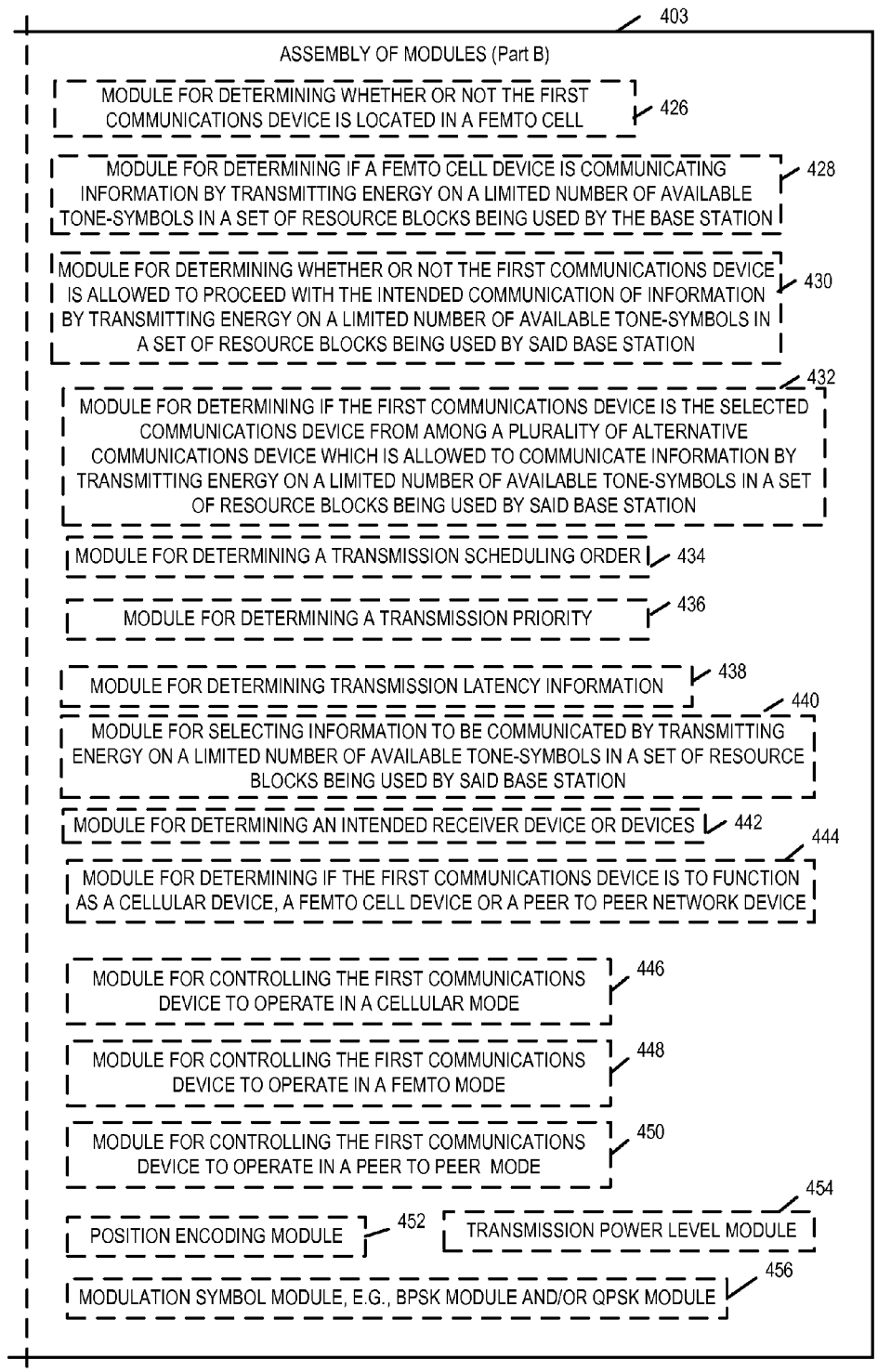
FIG. 4B is a second part of an assembly of modules which can, and in some embodiments is, used in the exemplary first communications device illustrated in FIG. 3.

FIG. 4, comprising the combination of part A 401 and part B 403, is an assembly of modules 400 which can, and in some embodiments is, used in the exemplary first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of first communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated and/or described in the method of flowchart 200 of FIG. 2.

Assembly of modules 400 includes a module for identifying resource blocks being used by said base station to communicate traffic data 404, a module for identifying sets of tone-symbols available in said resource block to said first communications device for use in transmitting information 412 and a module for communicating information by transmitting energy on a limited set of available tone-symbols in a set of resource blocks being used by said base station 414. Module 404 includes a module for storing base station transmission scheduling information identifying resource blocks used for transmitting control information and resource blocks used for transmitting traffic data 406, a module for synchronizing said first communications device to said base station 408 and a module for identifying resource blocks used by said base station for transmitting traffic data based on said stored base station transmission scheduling information and the firs communications device timing synchronization with said base station 410. Module 414 includes a module for excluding from the set of tone-symbols of a resource block on which energy may be transmitted, tone-symbols used by said base station to transmit pilot symbols 416 and a module for using position coding to communicate said information, the position within the resource block of a tone-symbol on which energy is transmitted being used to communicate information 418.

Assembly of modules 400 further includes a module for transmitting energy on less than two percent of the tone-symbols in each resource block in said set of resource blocks 420, a module for transmitting energy on no more than a single tone-symbol of each resource block 422, and a module for transmitting power on individual tone-symbols at a transmission power level that is as high or higher than the highest transmission power level used by the first communications device to transmit traffic data 424. In various embodiments one or more of modules 420, 422 and 424 is used by module 414 in transmitting energy on limited number of tone-symbols.

In some embodiments, assembly of modules 400 includes one or more or all of modules 426, 428, 430, 432, 434, 436, 438, 440, 442, 444, 446, 448, 450, 452, 454 and 456. Module 426 is a module for determining whether or not the first communications device is located in a femto cell. Module 428 is a module for determining if a femto cell device is communicating information by transmitting energy on a limited number of available tone-symbols in a set of resource blocks being used by the base station. Module 430 is a module for determining whether or not the first communication device is allowed to proceed with the intended communication of information by transmitting energy on a limited number of available tone-symbols in a set of resource blocks being used by said base station. For example consider that the first communications is a peer to peer communications device and that when peer to peer networks and femto cells overlap, the femto cells have priority for using the same resources as the cellular base station. In some such embodiments, module 426 determines whether or not the first communicates device is currently located in a femto cell and module 428 determines whether or not one or more devices of the femto cell are using the same resources as the cellular base station, and module 430 makes a decision whether or not the first communications device is allowed to proceed with the communication of module 414 based on the results of module 426 and module 428.

Module 432 is a module for determining if the first communications device is the selected communications device from among a plurality of alternative communications devices which are allowed to communicate information by transmitting energy on a limited number of available tone-symbols in a set of resource blocks being used by said base station. Module 434 is a module for determining a transmission scheduling order 434; module 436 is a module for determining a transmission priority 436; module 438 is a module for determining transmission latency information 438; and module 442 is a module for determining an intended receiver device or devices 442. For example, in some embodiments, a plurality peer to peer devices in a peer to peer network may be allowed to use the same resources as the base station concurrently for transmission at different times in accordance with a predetermined schedule and module 434 determines the ordering and module 432 determines if the first communications is device is the selected device for a current transmission opportunity, e.g., is the first communications device allowed to communicate information via module 414 at this transmission opportunity. As another example, in some embodiments, femto cell base stations are allowed to transmit using the same resources as the base station but femto cell mobile wireless terminals are not allowed to transmit using the same resources as the base station, and module 434 decides whether the first communications device is allowed to proceed with the communication of module 414 as a function of the type of femto cell device. In another example, the femto cell base station decides which femto cell device is allowed to transmit concurrently with the base station using the base station resource and communicates its selection to the mobile femto cell device that it selects when it selects a mobile femto cell device, and module 432 determines if the first communications device has been selected for this transmission opportunity. Module 440 is a module for selecting the information to be communicated by transmitting energy on a limited number of available tone-symbols in a set of resource blocks being used by said base station.

In some embodiments, the device or devices to which the information is transmitted, e.g., by module 414, is selected by module 442, e.g., within a femto cell base station, as a function of one or more of: priority information, latency information, predetermined scheduling order using information from one or more or all of modules 434, 436, and 438. In some embodiments, the information which is encoded and transmitted, e.g., by module 414, is selected by module 440 as a function of one or more of: priority information, latency information, predetermined scheduling order using information from one or more or all of modules 434, 436, and 438.

Module 444 is a module for determining if the first communications device is to function as a cellular device, a femto cell device or a peer to peer network device. Module 446 is a module for controlling the first communication device to operate in a cellular mode of operation; module 448 is a module for controlling the first communications device to operate in a femto mode of operation; and module 450 is a module for controlling the first communications device to operate in a peer to peer mode of operation. In some embodiments, the first communications device may, and sometimes does, operate at different times as a different type of device and module 444 determines how the first communications device is to operate at a given time, and modules 446, 448, and 450 are responsive to the determination of module 444.

Module 452 is a position encoding module; module 454 is a transmission power level module and module 456 is a modulation symbol module, e.g., a BPSK and/or QPSK module. One or more or all of modules 452, 454 and 456 are used by module 414 and/or module 418.

In some embodiments each resource block identified by module 404 includes at least 50 tone-symbols, e.g., at least 50 OFDM tone-symbols. In some embodiments, first communications device including assembly of modules 400 is a femto cell device located in a macro cell corresponding to said base station. In some embodiments, the transmitted information, transmitted by module 414, is control information. In various embodiments, first communications device including assembly of modules 400 is a peer to peer communications device located in a macro cell corresponding to said base station. In some such embodiment, said transmitted information communicated by module 414 is peer discovery information.

Various aspects and/or features of some embodiments will be further described. Various methods and apparatus are well suited for communicating short messages from a first device, e.g., a first femto cell device to one or more other femto cell devices or a first peer to peer device to one or more other peer to peer devices, over communications resources which are being used by an OFDM macro network, e.g., an OFDM cellular network. The femto cell signal or peer to peer signal goes on top of, e.g., is transmitted by a femto cell device or peer to peer device on the same communications resource or resources, on which a macro signal, e.g. a downlink signal from a cellular base station, is transmitted by the cellular base station. Since the signals from a femto cell device and/or a peer to peer device are transmitted on the same resources as the signals from the macro base station, they interfere with the Macro signal and potentially destroy a portion of the macro signal. However, the signals transmitted by the femto cell devices and/or peer to peer devices are designed so that they cause little interference to the Macro base station in terms of overall throughput and/or with the macro base stations ability to communicate control and/or pilot information.

A typical application for the signaling method of some embodiments would be for Femto discovery algorithms, i.e. Femto uses the proposed signaling for transmitting discovery signals without getting scheduled by the Macro. In addition, the transmission techniques described herein can be, and sometimes are, used by the femto cell or peer to peer device to quickly schedule small but delay sensitive packets like TCP Ack, Voice packets, gaming packets for to/from the Macro or to/from a Femto, or in a p2p setting using control/scheduling signals communicating relatively few bits, e.g., 64 or fewer bits, and which can be communicated without having to transmit power on a large number of OFDM tones being used by the Macro base station.

In accordance with various features of some embodiments, a femto cell device, femto cell devices, and/or peer to peer devices stores information about the transmission schedule, e.g., recurring transmission schedule, used by the macro base station of the macro cell in which the femto cell device or devices or peer to peer device is located. For purposes of explaining various features of some embodiments, consider that the device is a femto cell device, e.g., a femto cell base station, but the device could also be a peer to peer device or another device not under direct scheduling and/or power control of the base station.

The femto cell device uses knowledge of the macro cell's transmission schedule to identify sets of transmission resources, e.g., sets of OFDM tone-symbols, which can be used by the femto cell to transmit information in accordance with one feature of an exemplary embodiment. The sets of OFDM tone-symbols which may be used, in some embodiments, exclude OFDM tone-symbols corresponding to control channels of the macro cell. Furthermore, OFDM tone-symbols used for macro base station pilot signal transmissions, in some embodiments are also excluded by the femto cell device from possible use. The femto cell device identifies blocks of macro resource units, e.g., OFDM tone-symbols, which may be used for femto cell communications purposes. The femto cell device then communicates information by transmitting energy on one or a small number of OFDM tone-symbols in one or more blocks. The position within a block, e.g., on which tone-symbol or tone-symbols, a femto cell device places energy is used to communicate information. The femto cell device, in some embodiments, transmits at a relatively high transmission power level on the one or few tone-symbols it has determined to be available for use in a block. While the transmission of energy on, e.g., one tone-symbol, in a relatively large block of tone-symbols, may result in interference to the macro base station and/or cellular devices attempting to recover information from the macro base station on that tone-symbol, since it affects a relatively small number of tone-symbols being used by the macro base station the lost information due to the interference can normally be recovered through error correction codes and/or other techniques and will normally not have a significant impact on cellular communications. Furthermore, since the possible tone-symbols which may be used by the femto cell for such signaling is limited by the femto cell based on its knowledge of the macro cell transmission schedule and control signaling to avoid tone-symbols used for control, pilot and/or other important signals, the impact on the macro cell communications is minimized.

From the macro base station's perspective, the femto cell device transmissions are unscheduled. However, the femto cell device is carefully to keep track of the macro base stations transmission timing and schedule so that the femto cell uses the resources in a manner that is of limited harm to the macro base station. The user device, e.g., a femto cell wireless terminal, communicating with the femto cell base station is also aware of the femto cell's resource utilization and is able to recover the information transmitted on a relatively small number of tone-symbols using energy detection and by detecting which particular tone-symbol or tone-symbols within a data block the femto cell base station transmitted on. The energy level used for the transmissions by the femto cell base station device can be relatively high, e.g., at a fixed predetermined power level in some embodiments, since interference to the macro base station's communications with cellular wireless terminals is limited by the selection of which tone-symbols the femto cell may transmit on and the limited number of tone-symbols affected by the femto cell transmissions.

Several important features of some embodiments will be further described. A first feature of some embodiments is that unscheduled transmissions occur on a Macro downlink. In some embodiments, a Femto base station device uses one subframe to transmit discovery information using relatively high power signaling, e.g., relatively high power transmission on a limited number of tones in combination with the use of position coding, on the Macro downlink without being scheduled by Macro.

A second feature of some embodiments is the femto signaling is aware of the macro signaling. The relatively high power femto signaling using position coding, in some is restricted, in some embodiments, to occur within a data segment of a macro subframe and not within the control channels of the macro base station.

A third feature of some embodiments is that the femto signaling is aware of the macro scheduling structure. For example within the data segment of the macro level, the relatively high power femto signaling using position coding uses the macro scheduling structure of resource blocks (RBs). In particular, in some embodiments, the femto cell signaling uses one tone-symbol within each RB as defined by the macro or femto cell, and further avoids tone-symbols, used by the macro base station to communicate pilot signals.

FIGS. 5-8 illustrate an example of exemplary resource utilization by a femto cell base station device of macro cell resources in accordance with an exemplary embodiment.

Figure 5:
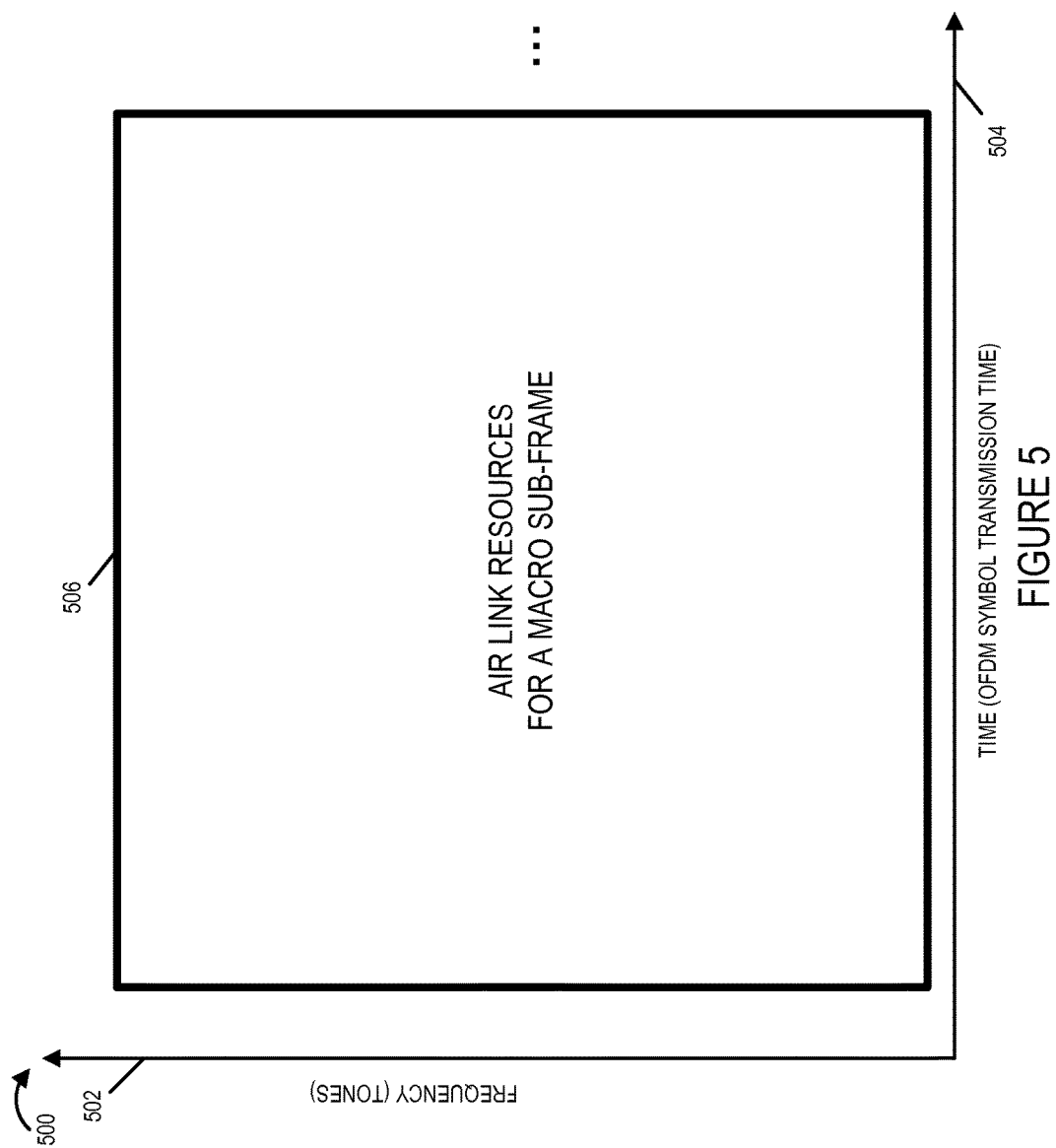
FIG. 5 illustrates exemplary air link resources for an exemplary macro sub-frame in accordance with an exemplary embodiment.
Figure 6:
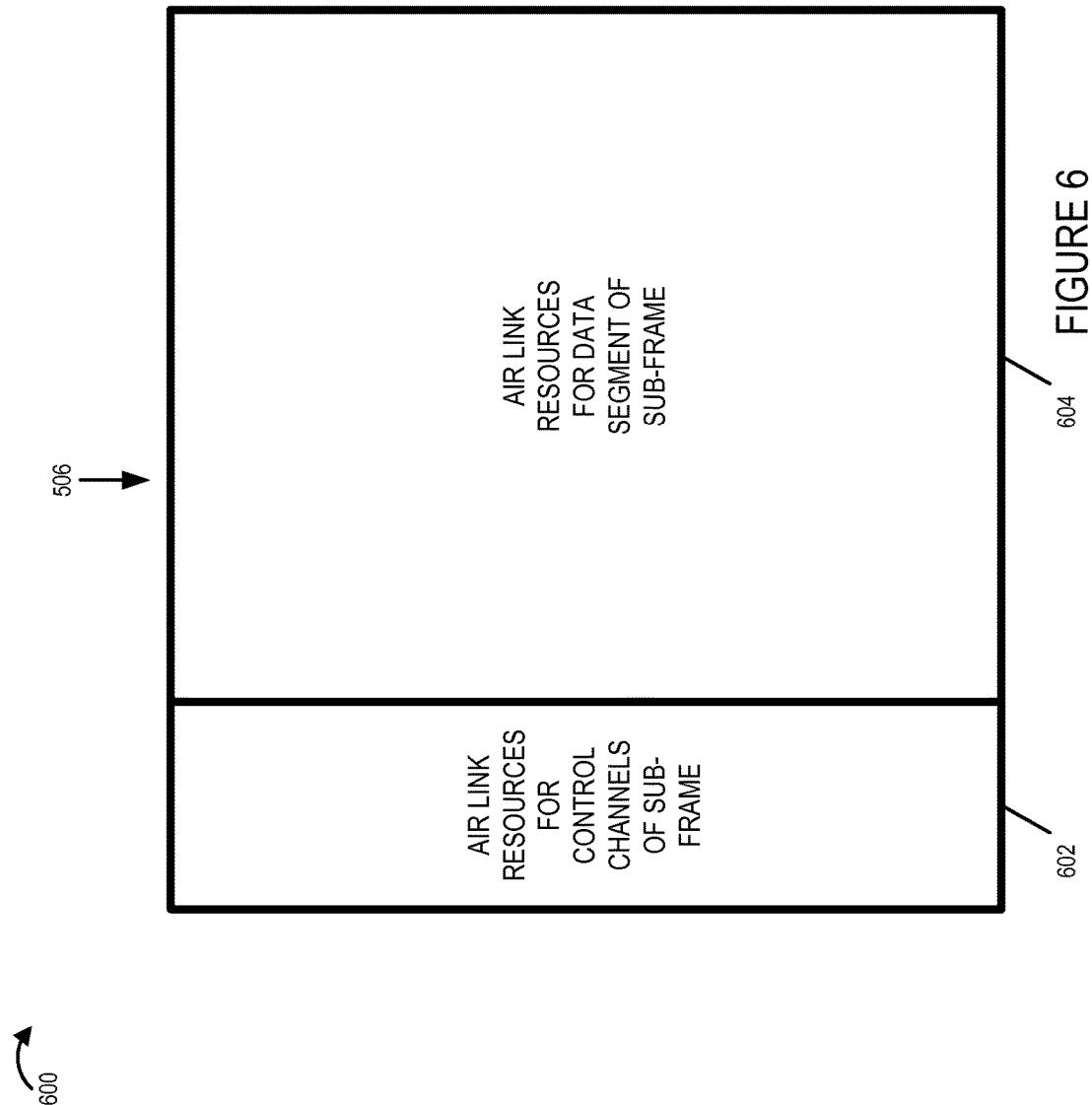
FIG. 6 illustrates exemplary air link resources for control channels of the subframe of FIG. 5 and exemplary air link resources for the data segment of the sub-frame of FIG. 5.
Figure 7:
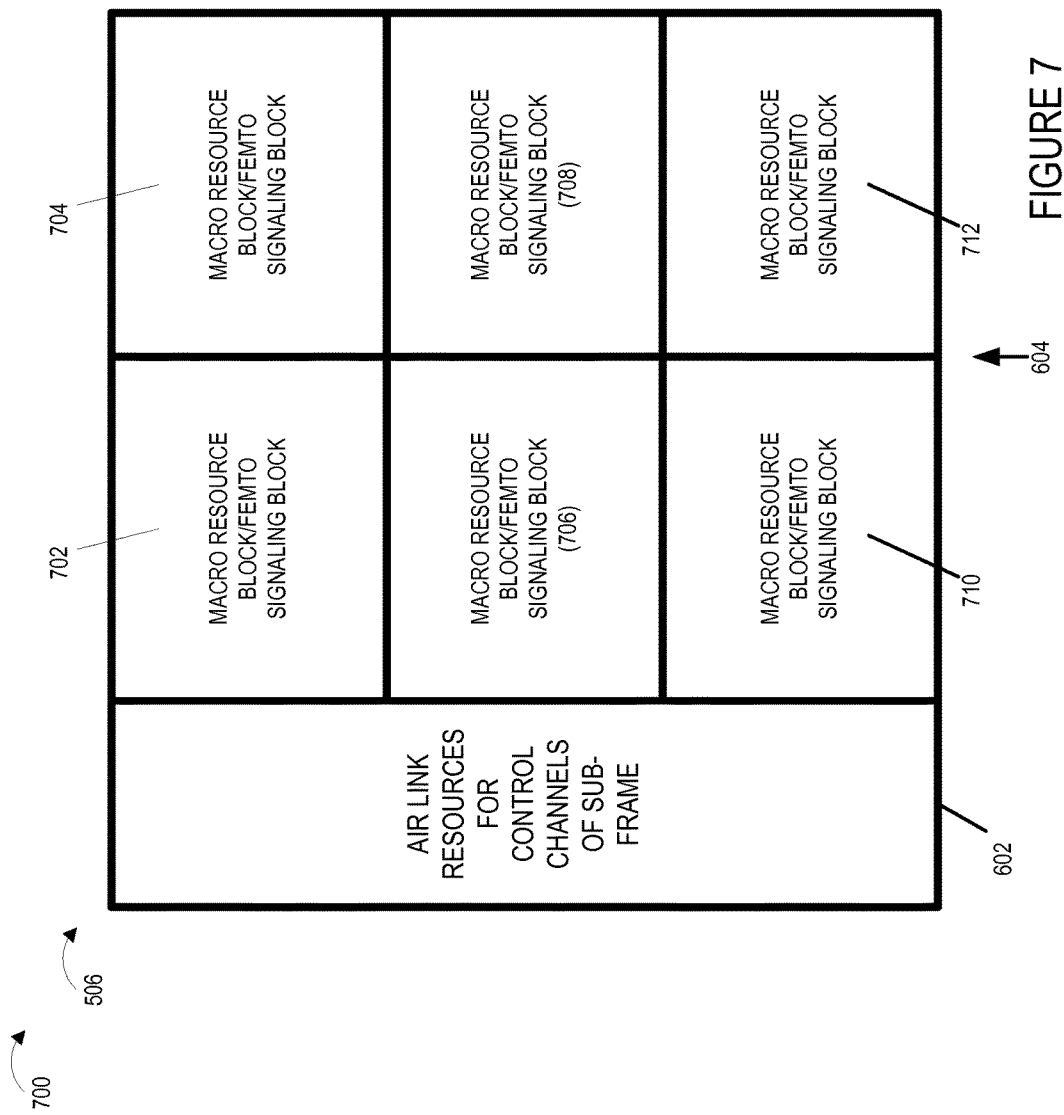
FIG. 7 illustrates that the exemplary data segment resources illustrated in FIG. 6 are partitioned into resource blocks which are used to carry both macro signals and femto signals.

In drawing 500 of FIG. 5, the vertical axis 502 represents frequency in units of tones, and the horizontal axis 504 represents time in units of OFDM symbol transmission time intervals. Block 506 represents exemplary air link resources for a macro cell sub-frame. Drawing 600 of FIG. 6 illustrates that the exemplary air link resources for a macro sub-frame 506 include air link resources for control sub-channels 602 and air link resources for the data segment of the sub-frame 604. Drawing 700 of FIG. 7 illustrates that the air link resources for the data segment of the sub-frame 604 are partitioned into a plurality of blocks (702, 704, 706, 708, 710, 712). Each of the blocks (702, 704, 706, 708, 710, 712) is both a macro resource block and a femto signaling block.

Figure 8:
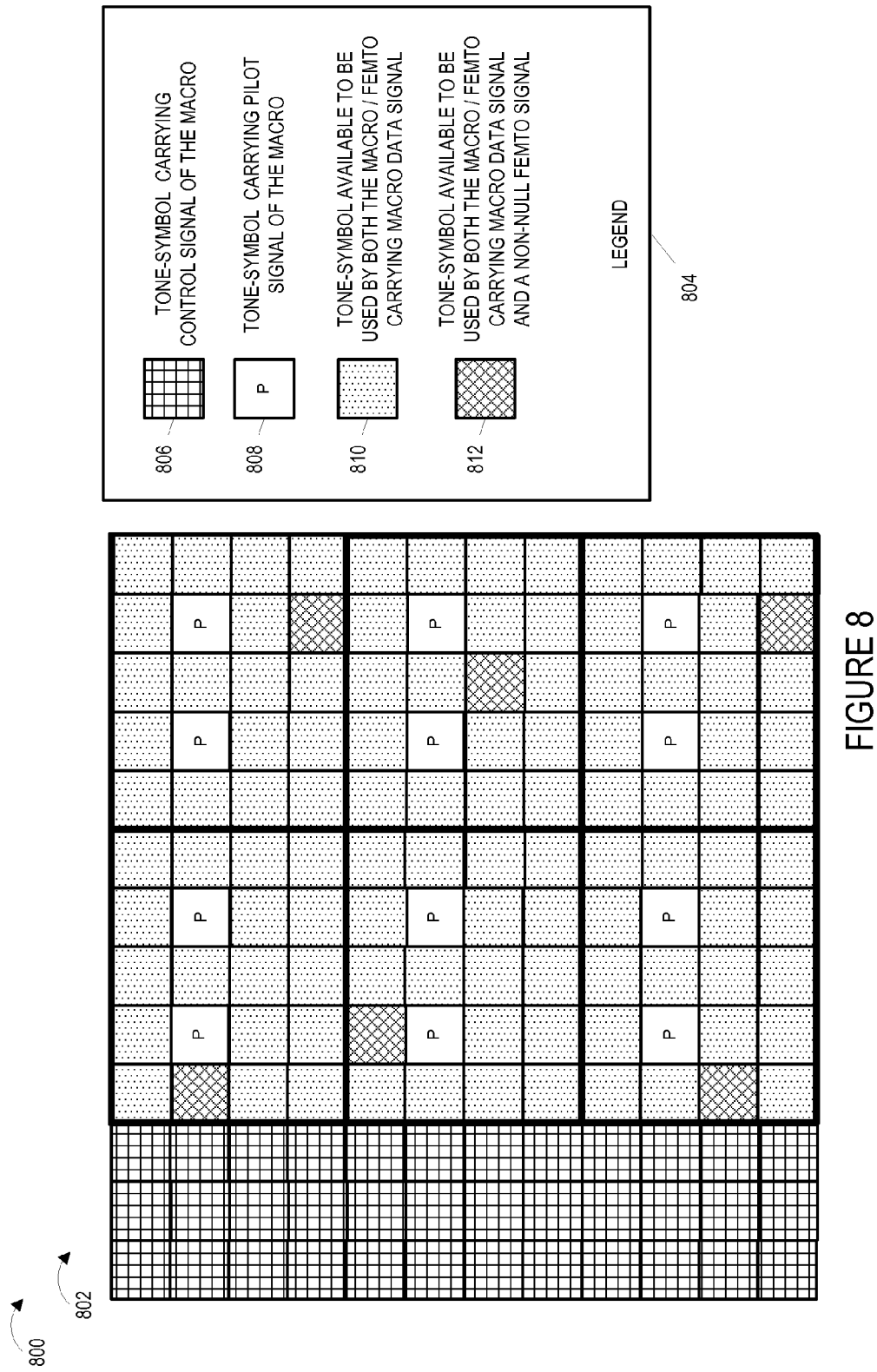
FIG. 8 illustrates the exemplary resource block of FIG. 5 and exemplary signaling carried by the exemplary tone-symbols of the resource block in accordance with one example.

FIG. 8 is drawing 800 including block 802 which represents air link resources and exemplary signaling and corresponding legend 804. Block 802 corresponds to the air link resources of block 506 of FIG. 5. Each small square of block 802 represents an OFDM tone-symbol, i.e., one tone for one symbol transmission time period. Exemplary block 802 includes 156 OFDM tone-symbols.

Legend 804 indicates that tone-symbols carrying control signals of the macro are indicated by crosshatch shading using vertical and horizontal lines as illustrated by exemplary OFDM tone-symbol 806. In this example, there are 36 OFDM tone-symbols in block 802 of type 806 corresponding to air link resources for control sub-frame 602.

Legend 804 indicates that the tone-symbols carry a pilot signal of the macro are indicated by a "P" within an unshaded square as indicated by exemplary OFDM tone-symbol 808. In this example, there are 12 OFDM tone-symbols in block 802 of type 808 corresponding to the data segment of the sub-frame 604. In this example, there are two OFDM tone-symbols per sub-block (702, 704, 706, 708, 710, 712) which are located at predetermined locations in accordance with the timing frequency structure. In this example, the pilot signals occur at the same location in each sub-block. In other examples, the position of the pilot signals may be, and sometimes is, different from one sub-block to another, e.g., in accordance with a predetermined pilot hopping scheme.

The remaining 108 tone-symbols of the air link resources for the data segment of the sub-frame 604 are shared resources available to be used by both the macro cell and the femto cell. The macro cell, e.g., the macro cell base station can transmit data signals using each of the remaining 108 tone-symbols of the air link resources for the data segment of the sub-frame 604. In this example, the femto cell, e.g., the femto cell base station device, uses position coding to communicate information and transmits a non-null signal on one of the remaining 108 tone-symbols in each of the sub-blocks (702, 704, 706, 708, 710, 712). The selection of which tone-symbol to use within the sub-block is to carry the femto cell non-null signal is a function of the information being communicated and the position coding scheme being used.

Legend 804 indicates that the tone-symbols which are available to be used by both the macro and femto and are carrying a macro data signal are indicated by dotted shading as indicated by exemplary OFDM tone-symbol 810. In this example, there are 100 OFDM tone-symbols in block 802 of type 810 corresponding to the data segment of the sub-frame 604.

Legend 804 indicates that the tone-symbols which are available to be used by both the macro and femto and are carrying a macro data signal and a non-null femto signal are indicated by diagonal crosshatch shading as indicated by exemplary OFDM tone-symbol 812. In this example, there are 8 OFDM tone-symbols in block 802 of type 812 corresponding to the data segment of the sub-frame 604.

In some exemplary embodiments, the approach illustrated in the example of FIGS. 5-8 is used in the context of an LTE embodiment, e.g., a 5 MHz LTE embodiment. In one such embodiment, each LTE subframe of 1 ms is divided into control channels and data channels. Since control channels typically require higher reliability than the data channels, in some embodiments, the data channels are used for carrying femto signaling concurrently; however, the control channels are not used for femto signaling. In one embodiment, the data channel is further divided into 25 resource block (RBs), each resource block having 72 tone-symbols. Each RB is a scheduling unit for the Macro; so the exemplary method keeps the damage to any given RB minimal by using exactly one tone-symbol within an RB. It should be appreciated that the above diagram of FIG. 8 shows fewer than the actual number of tone-symbols of an LTE subframe and is intended to be exemplary and not show the number of tone-symbols of an actual complete LTE subframe.

The transmitter, e.g., the femto device transmitter or peer to peer device transmitter, uses one tone within each RB. The location of the tone carries the coded information. Since a transmitter, e.g., a femto device transmitter or a peer to peer device transmitter, uses only one tone within each RB, it causes small damage to each of the Macro transmissions, e.g., the loss in capacity is roughly $1/72$. Moreover, the signal can be designed to avoid crucial tones like the pilots tones. Further, in some embodiments, information can be, and in some embodiments is encoded in the phase and/or amplitude of the femto signal or peer to peer signal.

For the LTE numerology, in one exemplary embodiment, the location of the tone carries coded information of ~6 bits (log2(64)). With 25 RBs, this amounts to about 150 coded bits.

Using a (25,12) Reed Solomon $GF(2^6)$, one can encode 72 bits of information on one LTE subframe.

An exemplary receiver method can work as follows: determine the index of the tone-symbol conveying the high power signal that was sent for each RB. Decode the communicated data based on the code used, e.g., to encode the data, assuming that the high powered tone-symbol was subject to a communications error.

A theoretical basis for the proposed solution is that the Gaussian interference is the worst case interference for a Gaussian signal. Hence, we create a non Gaussian peaky interference which creates minimal penalty to the underlying Gaussian signal that it interferes with. As a practical note, a typical receiver is already robust to such peaky interference.

Note that the signaling proposed is not optimal from the Femto's point of view, since the signaling used is peaky which is not the optimal scheme. However, from a system's point of view, the benefit is obtained by minimizing interference to the Macro.

In various embodiments a device of any of one or more of FIGS. 1-8 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the information collection device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals, access points such as base stations, and/or communications systems. Mobile nodes include, e.g., WAN cellular wireless mobile nodes, peer to peer wireless mobile nodes, femto cell wireless mobile nodes, and/or mobile wireless devices including capabilities for one or more or all of: WAN cellular communications, femeto cell communications, and peer to peer communications. Exemplary base stations include WAN cellular base stations and femto cell base stations. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. In some embodiments the modules are implemented in hardware, e.g., using circuits. However, not all embodiments are limited to purely hardware embodiments. In various embodiments modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device located within a cell of a base station, to communicate information to a second communications device, using communications resources which are also being used by said base station, the method comprising:
   identifying resource blocks being used by the base station to communicate traffic data;
   identifying in the first communications device, a first set of tone-symbols being used by said base station to communicate control signals, wherein the first set of tone-symbols is available in the resource blocks;
   identifying in the first communications device, a second set of tone-symbols being used by the base station to communicate pilot signals, wherein the second set of tone-symbols is available in the resource blocks; and
   reducing interference between the base station and a plurality of wireless terminals being serviced by the base station by communicating information from the first communications device to the second communications device by using position coding, wherein the second communications device is different than the base station, wherein using position coding comprises transmitting one or more non-null signals using one or more tone-symbols available in one or more positions in a resource block of the resource blocks other than tone-symbols belonging to either the first set or the second set and selecting a tone-symbol from among the one or more tone-symbols within the resource block to carry a non-null signal from among the one or more non-null signals based on the communicated traffic data and the position coding, wherein the one or more positions within the resource block of the one or more tone-symbols transmitted by using position coding are used to communicate the information, and wherein using position coding further comprises transmitting energy on between three-quarters of one percent to two percent of the tone-symbols in each resource block.

2. The method of claim 1, wherein the identifying the resource blocks includes:
   storing base station transmission scheduling information identifying resource blocks used for transmitting control information and resource blocks used for transmitting traffic data;
   synchronizing said first communications device to said base station; and
   identifying resource blocks used by said base station for transmitting traffic data based on said stored base station transmission scheduling information and the first communications device timing synchronization with said base station.

3. The method of claim 2, wherein using position coding further comprises transmitting energy on no more than a single tone-symbol of each resource block.

4. The method of claim 3, wherein each resource block includes at least 50 tone-symbols.

5. The method of claim 1, wherein each resource block includes less than one hundred fifty tone-symbols.

6. The method of claim 1, wherein using position coding further comprises transmitting power on individual tone-symbols at a transmission power level which is at least as high as the highest transmission power level used by said first communications device to transmit traffic data.

7. The method of claim 1, wherein said first communications device is a femto cell device located in a macro cell corresponding to said base station.

8. The method of claim 1, further comprising:
   selecting based on a position coding scheme, the one or more tone-symbols from among tone-symbols other than those belonging to either the first set or the second set.

9. The method of claim 1, wherein the one or more non-null signals comprise one or more discovery signals that are scheduled by the first communications device, independent of the base station.

10. A first communications device comprising:
    means for identifying resource blocks being used by a base station to communicate traffic data;
    means for identifying a first set of tone-symbols being used by the base station to communicate control signals, wherein the first set of tone-symbols is available in the resource blocks;
    means for identifying a second set of tone-symbols being used by the base station to communicate pilot signals, wherein the second set of tone-symbols is available in the resource blocks; and
    means for reducing interference between the base station and a plurality of wireless terminals being serviced by the base station by communicating information to a second communications device using position coding, wherein the second communications device is different than the base station, wherein using position coding comprises transmitting one or more non-null signals using one or more tone-symbols available in one or more positions in a resource block of the resource blocks other than tone-symbols belonging to either the first set or the second set and selecting a tone-symbol from among the one or more tone-symbols within the resource block to carry a non-null signal from among the one or more non-null signals based on the communicated traffic data and the position coding, wherein the one or more positions within the resource block of the one or more tone-symbols transmitted by using position coding are used to communicate the information, and wherein using position coding further comprises transmitting energy on between three-quarters of one percent to two percent of the tone-symbols in each resource block.

11. The first communications device of claim 10, wherein each non-null signal comprises a non-null femto signal, and wherein coded information is carried by a location of the non-null femto signal.

12. The first communications device of claim 10, wherein said means for identifying the resource blocks includes:
   means for storing base station transmission scheduling information identifying resource blocks used for transmitting control information and resource blocks used for transmitting traffic data;
   means for synchronizing said first communications device to said base station; and
   means for identifying resource blocks used by said base station for transmitting traffic data based on said stored base station transmission scheduling information and the first communications device timing synchronization with said base station.

13. The first communications device of claim 10, wherein each resource block includes less than one hundred fifty tone-symbols.

14. A computer program product for use in a first communications device to communicate with a second communications device, the computer program product comprising:
   a non-transitory computer readable medium storing instructions executable by a processor to perform a method, the method comprising:
      identifying resource blocks being used by a base station to communicate traffic data;
      identifying a first set of tone-symbols being used by the base station to communicate control signals, wherein the first set of tone-symbols is available in the resource blocks;
      identifying a second set of tone-symbols being used by the base station to communicate pilot signals, wherein the second set of tone-symbols is available in the resource blocks; and
      reducing interference between the base station and a plurality of wireless terminals being serviced by the base station by communicating information with the second communications device using position coding, wherein using position coding comprises transmitting one or more non-null signals using one or more tone-symbols available in one or more positions in a resource block of the resource blocks other than tone-symbols belonging to either the first set or the second set and selecting a tone-symbol from among the one or more tone-symbols within the resource block to carry a non-null signal from among the one or more non-null signals based on the communicated traffic data and the position coding, wherein the one or more positions within the resource block of the one or more tone-symbols transmitted by using position coding are used to communicate the information, and wherein using position coding further comprises transmitting energy on between three-quarters of one percent to two percent of the tone-symbols in each resource block.

15. A first communications device comprising:
at least one processor configured to:
   identify resource blocks being used by a base station to communicate traffic data;
   identify a first set of tone-symbols being used by the base station to communicate control signals, wherein the first set of tone-symbols is available in the resource blocks;
   identify a second set of tone-symbols being used by the base station to communicate pilot signals, wherein the second set of tone-symbols is available in the resource blocks; and
   reduce interference between the base station and a plurality of wireless terminals being serviced by the base station by communicating information to a second communications device that is different than the base station using position coding, wherein using position coding comprises transmitting one or more non-null signals using one or more tone-symbols available in one or more positions in a resource block of the resource blocks other than tone-symbols belonging to either the first set or the second set and selecting a tone-symbol from among the one or more tone-symbols within the resource block to carry a non-null signal from among the one or more non-null signals based on the communicated traffic data and the position coding, wherein the one or more positions within the resource block of the one or more tone-symbols transmitted by using position coding are used to communicate the information, and wherein using position coding further comprises transmitting energy on between three-quarters of one percent to two percent of the tone-symbols in each resource block; and
memory coupled to said at least one processor.

16. The first communications device of claim 15, wherein each non-null signal comprises a non-null femto signal, and wherein coded information is carried by a location of the non-null femto signal.

17. The first communications device of claim 15, wherein said at least one processor is configured to:
   store base station transmission scheduling information identifying resource blocks used for transmitting control information and resource blocks used for transmitting traffic data;
   synchronize said first communications device to said base station; and
   identify resource blocks used by said base station for transmitting traffic data based on said stored base station transmission scheduling information and the first communications device timing synchronization with said base station, as part of being configured to identify the first set of tone-symbols.

18. The first communications device of claim 15, wherein each resource block includes less than one hundred fifty tone-symbols.

* * * * *